(12) United States Patent
Takahashi et al.

(10) Patent No.: US 6,362,348 B1
(45) Date of Patent: Mar. 26, 2002

(54) ADDITIVE FOR INKJET PRINTING, RECORDING SOLUTION, METHOD FOR PREVENTING DISCOLORATION AND FADING OF IMAGE, AND RECORDING SHEET

(75) Inventors: Hiroshi Takahashi; Nobuo Uotani; Yuji Itoh; Toshio Koshikawa, all of Chiba (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/496,647

(22) Filed: Feb. 3, 2000

Related U.S. Application Data
(60) Provisional application No. 60/125,938, filed on Mar. 23, 1999.

(30) Foreign Application Priority Data

Feb. 3, 1999 (JP) ............................................ 11-026473

(51) Int. Cl.[7] ............................................ C07D 307/62
(52) U.S. Cl. ........................ 549/315; 549/205; 549/218; 536/4.1
(58) Field of Search ................................. 549/315, 205, 549/218; 536/4.1

(56) References Cited

U.S. PATENT DOCUMENTS

| 5,215,767 A | 6/1993 | Mitsuhashi | .................. 426/72 |

FOREIGN PATENT DOCUMENTS

| EP | 667 245 | 8/1995 | |
| EP | 875 246 | 11/1998 | |
| JP | 2-228379 | 9/1990 | ............ C09D/11/00 |
| JP | 7-331150 | 12/1995 | ............ C09D/11/02 |
| JP | 9-95634 | 4/1997 | ............ C09D/11/00 |
| JP | 9-302294 | 11/1997 | ............ C09D/11/02 |

*Primary Examiner*—Amelia Owens
(74) *Attorney, Agent, or Firm*—Sughrue Mion, PLLC

(57) ABSTRACT

An additive for inkjet printing, comprising a stabilized ascorbic acid derivative. Also disclosed are a recording solution, a method for preventing discoloration and fading of an image, and a recording sheet, each using the additive. The color change of an image can be prevented by incorporating the stabilized ascorbic acid derivative into an inkjet-printed image.

4 Claims, No Drawings

ADDITIVE FOR INKJET PRINTING, RECORDING SOLUTION, METHOD FOR PREVENTING DISCOLORATION AND FADING OF IMAGE, AND RECORDING SHEET

CROSS-REFERENCE TO RELATED APPLICATION

The present application is an application pursuant to 35 U.S.C. §111(a) with claiming in compliance with 35 U.S.C. §119(e)(1) the benefit of earlier filing date of Provisional Application No. 60/125,938, filed on Mar. 23, 1999 under 35 U.S.C. §111(b).

FIELD OF THE INVENTION

The present invention relates to an additive for inkjet printing, a recording solution, a method for preventing discoloration and fading of an image and a recording sheet.

BACKGROUND OF THE INVENTION

Inkjet printing is characterized in that the printer itself is inexpensive, the running cost is low and the color recording is facilitated, therefore, the inkjet printer is rapidly prevailing in recent years as an output device of digital signals from computer, digital camera and the like. As the ink for inkjet printing, various types of recording solutions such as an ink obtained by dissolving a dye in an aqueous medium or non-aqueous medium, an ink obtained by dispersing a pigment in an aqueous or oily solvent and a solid ink capable of thermal fusion have been heretofore put into practice or proposed. At the present time, an ink obtained by dissolving a dye in an aqueous medium is mainly prevailing and this ink is characterized by beautiful color and high safety to human body and to environment.

Particularly in recent years, an inkjet printer capable of easy printing at home or office is popularized and a printer capable of forming an image almost like a silver salt photograph has been developed. However, the aqueous dye is readily discolored or faded and accordingly, is inferior in the storage stability to the silver salt photograph. Due to this, the image formed and the hue thereof are disadvantageously liable to deteriorate in aging.

As a technique for solving such a problem, a method of using a pigment dispersion-type ink has been proposed and this is already used in practice for black ink and has succeeded in achieving excellent storage stability as compared with conventional inks using a dye. However, the inkjet printer has a tendency in recent years to have finer and finer nozzles for jetting out an ink so as to obtain a high-quality image and the pigment particle itself is also becoming small in the particle size for preventing the clogging of nozzles. As the pigment particle size is smaller, the light fastness is more inferior and the image is more easily discolored or faded. Accordingly, the change of ink into a pigment dispersion cannot be necessarily a countermeasure for the discoloration or fading. Moreover, a pigment dispersion-type ink has not yet been put into practice for color inks which are more outstandingly discolored or faded than the black ink in a photographic image.

Other than the above-described technique, various methods have been proposed to prevent the deterioration of a dye. For example, a method for preventing discoloration or fading by incorporating an ascorbic acid or the like into an ink is disclosed in JP-A-2-228379 (the term "JP-A" as used herein means an "unexamined Japanese patent application"), JP-A-7-331150, JP-A-9-95634 and JP-A-9-302294. The ascorbic acid or an inorganic salt thereof is relatively stable in the crystal and dry state, however, is colored and decomposed when it absorbs moisture. Furthermore, in the region of from neutral to alkaline condition, the ascorbic acid is accelerated to oxidize due to oxygen in air and easily decomposed. Accordingly, it is difficult to use the oxidation resistant effect of the ascorbic acid and, even if there is such an effect, the effect does not continue because the ascorbic acid is readily oxidized. Thus, the effect of preventing the discoloration or fading of a dye is not satisfactory.

SUMMARY OF THE INVENTION

An object of the present invention is to provide an additive for inkjet printing, capable of preventing discoloration or fading (in the present invention, referred to as "color change") of an image formed by the inkjet printing.

Another object of the invention is to provide a recording solution containing the additive.

A still other object of the invention is to provide a method for preventing color change of image using the additive.

A further other object of the invention is to provide a recording sheet containing the additive.

Other objects and effects of the present invention will become apparent from the following description.

As a result of extensive investigations for solving the problems encountered in conventional techniques, the present inventors have found that the color change can be remarkably improved by incorporating a specific compound into an inkjet-printed image.

More specifically, the above described objectives of the present invention have been achieved by providing the following additives, recording solutions, methods for preventing image discoloration and image fading, and recording sheets.

(1) An additive for inkjet printing, comprising a stabilized ascorbic acid derivative.

(2) The additive according to item (1) above, wherein said stabilized ascorbic acid derivative is:

an ascorbic acid derivative wherein at least one of the groups derived from the hydroxyl groups at the 2- and 3-positions of ascorbic acid is an ester with an inorganic or organic acid or a glycoside with a saccharide and at least one of the groups derived from the hydroxyl groups at the 5- and 6-positions of ascorbic acid may form an ester with an inorganic or organic acid; or a salt thereof.

(3) The additive according to item (2) above, wherein said stabilized ascorbic acid derivative is:

an ascorbic acid derivative wherein the group derived from the hydroxyl group at the 2-position of ascorbic acid is an ester with a phosphoric acid or a glucoside with a glucose and at least one of the groups derived from the hydroxyl groups at the 3-, 5- and 6-positions of ascorbic acid may form an ester with an inorganic or organic acid; or a salt thereof.

(4) The additive according to item (2) above, wherein said stabilized ascorbic acid derivative is an alkali metal, alkaline earth metal or transition metal salt of ascorbic acid-2-phosphate, an ascorbic acid-2-glucoside or a 6-ester thereof with an organic acid.

(5) A recording solution for inkjet printing, comprising a recording agent for forming a printing image, a liquid medium for dissolving or dispersing said recording agent and the additive according to any one of items (1) to (4) above.

(6) The recording solution according to item (5) above, wherein said liquid medium is an aqueous medium.

(7) The recording solution according to item (6) above, wherein said recording agent is a dye.

(8) The recording solution according to item (7) above, wherein the recording solution has a pH of from 7 to 12.

(9) The recording solution according to any one of items (6) to (8) above, wherein the additive is an ascorbic acid-2-phosphate alkali metal salt.

(10) A method for preventing discoloration and fading of an image, comprising providing the additive according to any one of items (1) to (4) above for an image formed by an inkjet printing method.

(11) The method according to item (10) above, wherein said provision of the additive is carried out by incorporating the additive into a recording solution to form an image.

(12) The method according to item (10) above, wherein said provision of the additive is carried out by incorporating the additive into a recording sheet onto which an image to be formed.

(13) The method according to item (10) above, wherein said provision of the additive is carried out by incorporating the additive into an image formed on a recording sheet.

(14) A recording sheet for inkjet printing, containing the additive according to any one of items (1) to (4) above.

(15) A recording sheet for inkjet printing, having an image formed thereon, which image contains the additive according to any one of items (1) to (4) above.

DETAILED DESCRIPTION OF THE INVENTION

The present invention is described in detail below.

The ascorbic acid is relatively stable in the crystal and dry state, however, is colored and decomposed when it absorbs moisture. Furthermore, in the region of from neutral to alkaline conditions, the ascorbic acid is accelerated to oxidize due to oxygen in air and is readily decomposed. Accordingly, the use of ascorbic acid itself as an additive for an inkjet printing ink is not effective in bringing out the ascorbic acid activity. Even if there is an effect, the effect disadvantageously does not continue because the ascorbic acid is readily oxidized.

The stabilized ascorbic acid derivative for use in the additive for inkjet printing of the present invention is an ascorbic acid derivative which has an ascorbic acid skeleton and in which at least one groups derived from the hydroxyl groups at the 2- and 3-positions of ascorbic acid is protected preferably by forming an ester with an inorganic or organic acid or forming a glycoside with a saccharide, or a salt of the ascorbic acid derivative. The stabilized ascorbic acid derivative for use in the present invention is not readily decomposed by light or heat. In this stabilized ascorbic acid derivative, a free hydroxyl group is formed at the 2- or 3-position when the situation requires, and thereby an ascorbic acid activity such as reducing property, oxidation resistant property or radical scavenging can be brought out.

The stabilized ascorbic acid derivative for use in the present invention preferably has a structure such that at least one of the groups derived from the hydroxyl groups at the 2- or 3-positions of the ascorbic acid is an ester with an inorganic or organic acid or a glycoside with a saccharide. Examples of the inorganic acid include a phosphoric acid (monophosphoric acid), a pyrophosphoric acid, a triphosphoric acid, a polyphosphoric acid, a derivative of these phosphoric acids and a sulfuric acid. Among these, a phosphoric acid, a pyrophosphoric acid and a triphosphoric acid are preferred in view of stability, and a phosphoric acid is more preferred. Examples of the organic acid include saturated fatty acids and unsaturated fatty acids, such as acetic acid, propionic acid, butyric acid, isobutyric acid, pivalic acid, valeric acid, isovaleric acid, lauric acid, myristic acid, palmitic acid, stearic acid, propiolic acid, crotonic acid and oleic acid. The saccharide is preferably glucose. The groups derived from the hydroxyl groups at both the 2-position and the 3-position may be an ester or a glycoside, however, one of them is preferably a hydroxyl group.

The hydroxyl group at the 2- or 3-position or the hydroxyl groups at both the 2-position and the 3-position may form a ketal with ketone or an acetal with aldehyde. In this case, a hemiketal or a hemiacetal may be formed. Examples of the ketone and the aldehyde include acetone, methyl ethyl ketone, diethyl ketone, cyclopentanone, cyclohexanone and benzaldehyde.

At least one of the hydroxyl groups at the 5- and 6-position may form an ester with an inorganic or organic acid. Although it depends on the substituents at the 2- or 3-position, the hydroxyl groups at both the 5-position and the 6-position are preferably a hydroxyl group when an aqueous medium is used for the ink. In the case where the 2-position is a glycoside, the oil solubility can be increased by having a higher fatty acid ester structure at the 6-position. Examples of the inorganic acid include a phosphoric acid (monophosphoric acid), a pyrophosphoric acid, a triphosphoric acid, a polyphosphoric acid, a derivative of these phosphoric acids and a sulfuric acid. Examples of the organic acid include saturated fatty acids and unsaturated fatty acids, such as acetic acid, propionic acid, butyric acid, isobutyric acid, pivalic acid, valeric acid, isovaleric acid, lauric acid, myristic acid, palmitic acid, stearic acid, propiolic acid, crotonic acid and oleic acid.

The hydroxyl group at the 5- or 6-position or the hydroxyl groups at both the 5-position and the 6-position may form a ketal with ketone or an acetal with aldehyde. In this case, a hemiketal or a hemiacetal may also be formed. Examples of the ketone and the aldehyde include acetone, methyl ethyl ketone, diethyl ketone, cyclopentanone, cyclohexanone and benzaldehyde.

In the case of an ester with an inorganic acid, a salt thereof formed with an alkali metal, an alkaline earth metal, a metal other than these, ammonia or an amine may be used. Among these, preferred are an alkali metal salt such as sodium salt and potassium salt, an alkaline earth metal salt such as calcium salt and magnesium salt or a transition metal salt, more preferred is an alkali metal salt such as sodium salt and potassium salt. A double salt thereof may also preferably used.

The stabilized ascorbic acid derivative is not particularly limited and may be any of the D-form, the L-form, the DL-form and the racemic modification.

Specific examples thereof include ascorbic acid-2-phosphate, sodium ascorbic acid-2-phosphate, potassium ascorbic acid-2-phosphate, magnesium ascorbic acid-2-phosphate, calcium ascorbic acid-2-phosphate, zinc ascorbic acid-2-phosphate, sodium ascorbic acid-2-pyrophosphate, ascorbic acid-2-triphosphate, ascorbic acid-2-polyphosphate, ascorbic acid-2-sulfate, sodium ascorbic acid-2-sulfate, ascorbic acid-2-ethylhydrogenphosphate, ascorbic acid-2-dodecylhydrogenphosphate, ascorbic acid-2-heptylhydrogen-phosphate, calcium ascorbic acid-2-octylhydrogenphosphate, ascorbic acid-2-propylhydrogenphosphate, disodium ascorbic acid-2-propylhydrogenphosphate, sodium potassium ascorbic acid-2-trihydrogendiphosphate, sodium ascorbic acid-2-phosphate, ascorbic acid-2-O-glucoside, ascorbic acid-2-O-glucoside-6-palmitate, ascorbic acid-2-O-glucoside-6-propionate, sodium ascorbic acid-3-phosphate, potassium ascorbic acid-3-phosphate, magnesium ascorbic acid-3-phosphate and sodium ascorbic acid-3-sulfate, however, the present invention is by no means limited thereto.

In view of compatibility with the recording solution, preferred are an alkali metal salt of ascorbic acid-2- phosphate, such as sodium ascorbic acid-2-phosphate and potassium ascorbic acid-2-phosphate, an alkaline earth metal salt of ascorbic acid-2-phosphate, such as magnesium ascorbic acid-2-phosphate and calcium ascorbic acid-2-phosphate, and a 2-position glycoside of ascorbic acid, such as ascorbic acid-2-O-glucoside and ascorbic acid-2-O-glucoside-6-palmitate, and more preferred are sodium ascorbic acid-2-phosphate and potassium ascorbic acid-2-phosphate.

These compounds may be used individually or by combining two or more thereof at any ratio.

The additive for inkjet printing is not particularly limited on the shape on use. It may suffice if the compound is finally incorporated into the printed image. The additive may be used, for example, by previously incorporating the compound into a recording solution, by incorporating the compound into a recording sheet and then performing printing on the sheet with a printer or the like, or by adding or coating the compound to a printed matter or image after the printing.

In the case of adding the compound to a recording solution, the amount of the compound added is preferably from 0.01 to 10 wt % of the recording solution.

The compound may be added as a solid content directly to the recording solution or may be dissolved or dispersed in a liquid medium and then mixed with a recording solution. In the case of dispersing the compound, a dispersant (for example, sodium hexametaphosphate, condensed sodium naphthalenesulfonate, ionic surfactant, polymer material or nonionic surfactant) may be used.

Out of the stabilized ascorbic acids, a water-soluble compound, for example, a compound where the 2-position is an inorganic ester or a salt thereof or a glycoside, is suitable because the addition to an aqueous recording solution is facilitated.

In the case of incorporating the compound into a recording sheet, the recording sheet is not particularly limited but examples thereof include paper, cloth and resin-made film. The method for incorporating the compound into the recording sheet is not particularly limited but is preferably incorporated in the form of a solution or a dispersion. On taking account of the environmental load due to volatilization of the organic solvent or the effect on human body, the compound is preferably incorporated after dissolving or dispersing it in water, an aqueous medium compatible to water or a mixed medium thereof. In the case of dispersing the compound, a dispersant (e.g., sodium hexametaphosphate, condensed sodium naphthalenesulfonate, ionic surface active agent, polymer substance, nonionic surface active agent) may be used. In the case of incorporating the compound with a liquid medium, the concentration of the additive is preferably from 0.1 to 40 wt %.

The compound may be incorporated into a recording sheet in the form of a solution or dispersion of the compound by a size pressing method, a roll coater method, a blade coater method, an air knife coater method, a gate roll coater method, a rod bar coater method, a curtain method, a slide hopper method, an extrusion method, a dip method, a spin coating method or a spray coating method. Also, the compound may be incorporated at the production of the recording sheet.

The amount of the compound contained in the recording sheet is not particularly limited and varies depending on the kind of the recording sheet, however, it is preferably from 0.001 to 10.0 g/m$^2$.

In the case where the compound is added to a recording sheet or an image after the inkjet printing, the method for adding the compound is not particularly limited, however, the compound is preferably added in the form of a solution or dispersion thereof or coated onto the surface thereof. On taking account of the environmental load due to volatilization or the effect on human body, the compound is preferably dissolved or dispersed in water, an aqueous medium or a mixed medium and then incorporated. The method for adding the compound is not particularly limited, however, the compound may be added in the form of a solution or dispersion thereof by a spraying method. In the case of adding the compound in the form of a solution or a dispersion, the concentration of the additive is preferably from 0.1 to 40 wt %. The content thereof varies depending on the kind of the recording solution or recording sheet, however, it is preferably from 0.001 to 10.0 g/m$^2$.

The additive using the compound may be sufficient if it is contained in an image formed by the inkjet printing and the above-described methods may be used by freely combining them.

Among these application forms, a method of previously adding the compound to a recording solution or incorporating it into a recording sheet is simple and convenient.

The compound is colorless and stable and even when it is added as an additive for inkjet printing, the compound very scarcely causes change in the hue of the recording agent, decomposition or reaction.

In order to increase the effect of preventing the color change, an ultraviolet ray inhibitor (e.g., an ultraviolet absorbent, an ultraviolet ray shielding agent) and/or an antioxidant may be used in combination.

The ultraviolet inhibitor for use in the present invention is not particularly limited. The ultraviolet absorbent may suffice if it absorbs light at a wavelength of 400 nm or less. Examples thereof include benzotriazole type, benzophenone type, triphenyltriazine type, dibenzoylmethane type, salicylic acid type, aminobenzoic acid type, urocanic acid type, cinnamic acid type and cesium oxide type. These prevent deterioration of a dye by absorbing ultraviolet rays and converting it into heat energy or the like.

Examples of the ultraviolet ray shielding agent include red iron oxide, titanium oxide, chromium oxide, black iron oxide, zirconium oxide, yellow iron oxide, zinc oxide, alumina, magnesium oxide, barium oxide, mica, talc, sericite, iron blue, kaolin, aluminum hydroxide, ultramarine blue, montmorillonite, calcium carbonate, silicic acid anhydride and silica. These prevent deterioration of a dye by shielding or scattering ultraviolet rays.

The antioxidant for use in the present invention is not particularly limited but examples thereof include phenol type, amine type, organic sulfur type, phosphite type and nickel type.

These ultraviolet inhibitors and/or antioxidants individually or as an admixture of two or more thereof may be used in combination with the compound at any ratio.

The method for using the ultraviolet inhibitor or antioxidant in combination is not particularly limited, but it may be previously added to a recording solution or incorporated into a recording sheet, or a solution of the compound may be added or coated to a printed matter or an image after the image is formed by a printer.

It may suffice if the compound, the ultraviolet inhibitor and/or the antioxidant, is incorporated into an image formed by the inkjet printing, and these may be incorporated by freely combining the above-described methods.

In the case of adding the ultraviolet inhibitor and/or the antioxidant to a recording solution, the amount thereof added is not particularly limited but it is preferably from 0.01 to 10 wt % of the recording solution.

The addition method is not particularly limited and the ultraviolet inhibitor and/or the antioxidant may be added in the form of a solid content directly to a recording solution or may be dissolved or dispersed in a liquid medium and then mixed with a recording solution. In the case of dispersing the ultraviolet inhibitor and/or the antioxidant, a dispersant (e.g., sodium hexametaphosphate, condensed sodium naphthalenesulfonate, ionic surface active agent, polymer substance, nonionic surface active agent) may be used.

In the case where the ultraviolet inhibitor and/or the antioxidant is incorporated into a recording sheet in combination with the compound of the present invention, the recording sheet is not particularly limited, however, for example, paper, cloth, resin-made film or the like may be used. The method for incorporating those into a recording sheet is not particularly limited but they are preferably incorporated or coated in the form of a solution or a dispersion. On taking account of the environmental load due to volatilization of the organic solvent or the effect on human body, they are preferably incorporated in the form of a solution or dispersion in water, an aqueous medium compatible to water or a mixed medium thereof. When these are incorporated with a liquid medium, the concentration thereof is preferably from 0.1 to 40 wt %. In the case of dispersing them, a dispersant (e.g., sodium hexametaphosphate, condensed sodium naphthalenesulfonate, ionic surface active agent, polymer substance, nonionic surface active agent) may be used. Also, the particle surface may be chemically modified by a sol-gel method to elevate the affinity for the liquid medium or the dispersibility.

The ultraviolet inhibitor and/or the antioxidant may be incorporated into a recording sheet in the form of a solution or dispersion thereof by a size pressing method, a roll coater method, a blade coater method, an air knife coater method, a gate roll coater method, a rod bar coater method, a curtain method, a slide hopper method, an extrusion method, a dip method, a spin coating method or a spray coating method. In the case of using a dispersion, a dispersant (e.g., sodium hexametaphosphate, condensed sodium naphthalenesulfonate, ionic surface active agent, polymer substance, nonionic surface active agent) may be used. Also, the particle surface may be chemically modified by a sol-gel method to elevate the affinity for the liquid medium or the dispersibility. The ultraviolet inhibitor and/or the antioxidant may also be incorporated at the production of the recording sheet.

The amount of the ultraviolet inhibitor and/or the antioxidant contained in the recording sheet is not particularly limited and varies depending on the recording sheet but is preferably from 0.001 to 10.0 g/m$^2$.

The recording solution for inkjet printing is described below. The recording agent for use in the recording solution for inkjet printing is not particularly limited, however, examples thereof include a dye and a pigment.

Specific examples of the dye are described below. Examples of the direct dye include:

Direct Black 2, 4, 9, 11, 14, 17, 19, 22, 27, 32, 36, 38, 41, 48, 49, 51, 56, 62, 71, 74, 75, 77, 78, 80, 91, 105, 106, 107, 108, 112, 113, 117, 132, 146, 151, 154, 194;

Direct Blue 1, 2, 6, 8, 15, 22, 25, 34, 69, 70, 71, 72, 75, 76, 78, 80, 81, 82, 83, 86, 90, 98, 106, 108, 110, 120, 123, 158, 163, 165, 192, 193, 194, 195, 196, 199, 200, 201, 202, 203, 207, 218, 236, 237, 239, 246, 258;

Direct Brown 1A, 2, 6, 25, 27, 44, 58, 95, 100, 101, 106, 112, 173, 194, 195, 209, 210, 211;

Direct Green 1, 6, 8, 28, 33, 37, 63, 64;

Direct Orange 6, 8, 10, 26, 29, 39, 41, 49, 51, 102;

Direct Red 1, 2, 4, 8, 9, 11, 13, 17, 20, 23, 24, 28, 31, 33, 37, 39, 44, 46, 47, 48, 51, 59, 62, 72, 80, 90, 101, 145, 189, 220, 225, 230;

Direct Violet 1, 7, 9, 12, 35, 48, 51, 90, 94; and

Direct Yellow 1, 2, 4, 8, 11, 12, 24, 26, 27, 28, 33, 34, 39, 41, 42, 44, 48, 50, 51, 58, 72, 85, 86, 87, 88, 98, 100, 110, 142.

Examples of the Acid Dye Include:

Acid Black 1, 2, 7, 16, 17, 24, 26, 28, 31, 41, 48, 52, 56, 58, 60, 63, 94, 107, 109, 112, 118, 119, 121, 122, 131, 155, 156, 172, 194, 208;

Acid Blue 1, 7, 9, 22, 23, 25, 27, 29, 40, 41, 43, 45, 49, 51, 53, 55, 56, 59, 62, 74, 78, 90, 91, 93, 90, 92, 93, 102, 104, 111, 113, 117, 120, 124, 126, 145, 167, 171, 175, 183, 185, 229, 234, 236, 254;

Acid Brown 4, 14;

Acid Green 3, 9, 12, 16, 19, 20, 25, 27, 41;

Acid Orange 7, 8, 10, 33, 56, 64;

Acid Red 1, 4, 6, 8, 13, 14, 15, 18, 19, 21, 26, 27, 30, 32, 34, 37, 38, 40, 42, 45, 51, 52, 54, 57, 80, 82, 83, 85, 87, 88, 89, 92, 94, 97, 106, 108, 110, 111, 119, 129, 131, 134, 135, 154, 155, 172, 176, 180, 184, 186, 187, 243, 249, 254, 256, 257, 270, 289, 317, 318;

Acid Violet 7, 11, 15, 34, 35, 41, 43, 49, 75; and

Acid Yellow 1, 3, 4, 7, 11, 12, 13, 14, 17, 18, 19, 23, 25, 29, 34, 36, 38, 40, 41, 42, 44, 49, 53, 55, 59, 61, 71, 72, 73, 76, 78, 99, 111, 114, 116, 122, 135, 161, 172.

Examples of the Basic Dye Include:

Basic Black 2, 8;

Basic Blue 1, 3, 5, 7, 9, 24, 25, 26, 28, 29;

Basic Brown 1, 12;

Basic Green 1, 4;

Basic Orange 2, 15, 21, 22;

Basic Red 1, 2, 9, 12, 13, 37;

Basic Violet 1, 3, 5, 7, 9, 24, 25, 26, 28, 29; and

Basic Yellow 1, 2, 11, 12, 14, 21, 32, 36.

Examples of the Reactive Dye Include:

Reactive Black 1, 3, 5, 6, 8, 12, 14;

Reactive Blue 2, 5, 7, 12, 13, 14, 15, 17, 18, 19, 20, 21, 25, 28, 37, 38, 40, 41, 71;

Reactive Brown 1, 7, 16;

Reactive Green 5, 7;

Reactive Orange 2, 5, 7, 16, 20, 24;

Reactive Red 6, 7, 11, 12, 15, 17, 21, 23, 24, 35, 36, 42, 63, 66;

Reactive Violet 2, 4, 5, 8, 9; and

Reactive Yellow 1, 2, 3, 13, 14, 15, 17.

Examples of the Food Dye Include:

Food Black 2;

Food Blue 3, 4, 5;

Food Green 2, 3;

Food Red 2, 3, 7, 9, 14, 52, 87, 92, 94, 102, 104, 105, 106;

Food Violet 2; and

Food Yellow 3, 4, 5;

Examples of the Disperse Dye Include:

Disperse Blue 1, 3, 14;

Disperse Orange 1, 3, 13, 25;

Disperse Red 1, 13, 19; and

Disperse Yellow 3, 5, 7, 9.

These dyes may be used individually or by combining two or more thereof at optional ratio.

Examples of the pigment include an organic pigment (e.g., phthalocyanine type, dioxazine type, anthraquinone type) and an inorganic pigment (e.g., titanium white, zinc white, lead white, carbon black type, red iron oxide, vermilion, cadmium red, chrome yellow, ultramarine blue, cobalt blue, cobalt violet, zinc chromate). These pigments may be used individually or by combining two or more thereof at an optional ratio.

The amount of the recording agent added is not particularly limited but is preferably from 0.1 to 10 wt % of the recording solution.

The liquid medium in which the recording agent is dissolved or dispersed is not particularly limited but examples thereof include water, alcohols (e.g., methanol, ethanol, n-propyl alcohol, isopropyl alcohol, butanol, 1,2,6-hexanetriol, glycerin), ketones (e.g., acetone, methyl ethyl ketone, methyl isobutyl ketone, cyclohexanone), ethers (e.g., diethyl ether, tetrahydrofuran, 1,4-dioxane), amides (e.g., N,N-dimethylformamide, N-methylformamide, N,N-dimethylacetamide, N-methylpropionamide), pyrrolidinones (e.g., 1-methyl-2-pyrrolidinone, 2-pyrrolidinone, ε-caprolactam, 1,3-dimethyl-2-imidazolidinone), aromatic hydrocarbons (e.g., benzene, toluene, xylene), aliphatic hydrocarbons (e.g., n-pentane, n-hexane, cyclohexane), glycols (e.g., ethylene glycol, propylene glycol, butylene glycol, trimethylene glycol, hexylene glycol, diethylene glycol, dipropylene glycol, polyethylene glycol) and glycol ethers (e.g., 2-methoxyethanol, 2-ethoxyethanol, 2-methoxyethanol, 2-propoxyethanol, 2-butoxyethanol, diethylene glycol monomethyl ether, diethylene glycol monoethyl ether, diethylene glycol monobutyl ether, triethylene glycol monoethyl ether, 1-methoxy-2-propanol, 1-ethoxy-2-propanol, dipropylene glycol monomethyl ether, dipropylene glycol monoethyl ether, tripropylene glycol monoethyl ether, 3-methoxy-1-methyl-1-butanol, propylene glycol monoethyl ether acetate).

These compounds may be used individually or by combining two or more thereof at an optional ratio.

The amount of the liquid medium used is not particularly limited, however, the total content thereof in the recording solution is preferably from 50 to 98 wt %.

In the case of dispersing the recording agent, a dispersant (e.g., sodium hexametaphosphate, condensed sodium naphthalenesulfonate, ionic surface active agent, polymer substance, nonionic surface active agent) may be used, if desired. Also, the surface of the recording agent particle may be chemically modified by a sol-gel method to elevate the affinity for the liquid medium or the dispersibility.

The compound to be incorporated into the recording solution is the same as the compound described for the additive for inkjet printing. In the case of adding the compound, the amount thereof added is not particularly limited but is preferably from 0.01 to 10 wt % of the recording solution.

The method for adding the compound is not particularly limited and the compound may be added in the form of a solid content directly to the recording solution or may be dissolved or dispersed in a liquid medium and then mixed with the recording solution.

In order to increase the effect of preventing the color change, an ultraviolet ray inhibitor and/or an antioxidant may be used in combination.

The ultraviolet inhibitor and/or antioxidant for use herein are not particularly limited and examples thereof include the compounds described and exemplified above in connection with the additive for inkjet printing. These compounds may be used individually or by combining two or more thereof at an optional ratio. The amount added and the addition method are either not particularly limited and these are described above in connection with the additive for inkjet printing.

If desired, the recording solution may contain in the composition thereof a water-soluble solvent (e.g., ethylene glycol, glycerol, propylene glycol, pentanediol), an antiseptic/antifungal (e.g., sodium dehydroacetate), a chelating agent (e.g., sodium ethylenediaminetetraacetate), an anticorrosive (e.g., ammon thioglycolate), an oxygen absorbent (e.g., sodium sulfite), a pH adjusting agent, a defoaming agent, a viscosity controlling agent, a penetrant, a nozzle drying inhibitor, and the like.

The liquid medium of the recording solution for inkjet printing is preferably an aqueous medium. The aqueous medium is a solvent thoroughly compatible to water and examples thereof include water, alcohols (e.g., methanol, ethanol, n-propyl alcohol, isopropyl alcohol, butanol, 1,2,6-hexanetriol, glycerin), ketones (e.g., acetone), ethers (e.g., tetrahydrofuran, 1,4-dioxane), amides (e.g., N,N-dimethylformamide, N-methylformamide, N,N-dimethylacetamide, N-methylpropionamide), pyrrolidinones (e.g., 1-methyl-2-pyrrolidinone, 2-pyrrolidinone, ε-caprolactam, 1,3-dimethyl-2-imidazolidinone), glycols (e.g., ethylene glycol, propylene glycol, butylene glycol, trimethylene glycol, hexylene glycol, diethylene glycol, dipropylene glycol, pentanediol, polyethylene glycol).

These aqueous mediums may be used individually or by combining two or more thereof at an optional ratio. The amount thereof used is not particularly limited but the total amount of the liquid medium in the recording solution is preferably from 50 to 98 wt %.

In the case of using an aqueous medium as the liquid medium, the recording agent for inkjet printing is preferably a dye. The dye used is not particularly limited and those described and exemplified above with respect to the recording agent for use in the recording solution for inkjet printing may be used.

The amount of the dye is not particularly limited but is preferably from 0.1 to 10 wt % of the recording solution.

The dye may be added in the form of a solid content directly to the recording solution or may be dissolved or dispersed in a liquid medium and then mixed.

The recording solution composition preferably has a pH (hydrogen-ion concentration exponent) of from 7 to 12. The method for measuring the pH is not particularly limited but a measurement method using a commercially available pH measuring apparatus is simple and convenient. A pH measuring apparatus using a glass electrode pH meter or the like is often used. The measurement conditions are usually aqueous solution, normal pressure (1 atm) and 25° C.

The present invention also provides a method for preventing image discoloration and image fading in the inkjet printing by using the compound of the present invention. Examples thereof include the use of the above-described additive for inkjet printing but the use method thereof is not particularly limited.

For example, the compound is previously added to a recording solution to prevent the color change or incorporated into a recording sheet to prevent the color change or the compound is added to or coated on a recording sheet or image after the image is formed by inkjet printing to thereby prevent the color change. These methods may be used individually or in combination of two or more thereof as a method for preventing the color change. The compound, the method for incorporating the compound and the content thereof are described above in connection with the additive for inkjet printing.

The compound has an ascorbic acid activity and by virtue of its reducing property or oxidation resistant property, the image formed by the inkjet printing can be imparted with light fastness when the compound is incorporated thereinto.

The mechanism in the color change of an image formed by a recording solution has been variously described, however, it is generally considered that decomposition of the recording agent due to light or decomposition or oxidation by oxygen, ozone, sulfur oxides or nitrogen oxides are responsible therefor. Accordingly, by adding a compound having reducing property or oxidation resistant property to the recording agent, the color change of the recording agent can be prevented.

In general, the stabilized ascorbic acid derivative of the present invention is effective in the prevention of color change of recording agent because it is not easily decomposed by light or heat and at the same time, can exhibit the ascorbic acid activity such as reducing property or oxidation resistant property.

The recording sheet having incorporated thereinto the additive of the present invention is described below. Examples of the compound are the same as the compound described for the additive for inkjet printing. The compounds may be used individually or by combining two or more thereof at an optional ratio. Furthermore, the recording sheet, the method for incorporating the compound and the content thereof are also the same as described above in connection with the additive for inkjet printing.

In order to increase the effect of preventing the color change, an ultraviolet ray inhibitor and/or an antioxidant may be used in combination.

The ultraviolet inhibitor and/or antioxidant for use herein are not particularly limited and examples thereof include the compounds described and exemplified above in connection with the additive for inkjet printing. These compounds may be used individually or by combining two or more thereof at an optional ratio. The method for incorporating the ultraviolet inhibitor and/or antioxidant and the content thereof are also the same as described above in connection with the additive for inkjet printing.

The recording sheet may be sufficient if the image on the recording sheet formed by the inkjet printing finally contains the compound and the method for incorporating the compound is not particularly limited. Examples of the recording sheet include a recording sheet which is printed by inkjet printing using a recording solution to which the compound is previously added, a recording sheet into which the compound is incorporated and which is printed by the inkjet printing, and a recording sheet in which an image is formed by inkjet printing and the compound is added to or coated on the image. These methods may be used individually or in combination of two or more thereof to form a recording sheet.

The specific method for adding the compound to the recording sheet, the amount thereof added, the recording sheet, the method for incorporating the compound to the recording sheet, the amount thereof incorporated, the method for incorporating the compound into an image or recording sheet after the printing, and the amount thereof incorporated all are as described above in connection with the additive for inkjet printing.

The additive for inkjet printing, the recording solution, the method for preventing color change of an image and the recording sheet of the present invention provide an image that is hardly deteriorated and hardly undergoes color change and hence has excellent storage stability.

The present invention will be described in greater detail below by referring to the Examples and Comparative Examples, however, the present invention is by no means limited thereto.

EXAMPLES 1 TO 3 AND COMPARATIVE EXAMPLES 1 TO 3

Addition to Recording Solution:

Recording solutions were prepared each to have a composition shown in Table 1 below. In the Table, the numerals are in parts by weight.

TABLE 1

| Composition No. | 1 | 2 | 3 | 4 | 5 | 6 |
|---|---|---|---|---|---|---|
| Acid Red 1 | 2 | | | 2 | | |
| Acid Yellow 17 | | 2 | | | 2 | |
| Acid Blue 249 | | | 2 | | | 2 |
| Glycerin | 12 | 12 | 12 | 12 | 12 | 12 |
| Ethylene glycol | 1 | 1 | 1 | 1 | 1 | 1 |
| Triethanolamine | 1 | 1 | 1 | 1 | 1 | 1 |
| Ion exchanged water | 79 | 79 | 79 | 74 | 74 | 74 |
| Sodium L-ascorbate-2-phosphate | 5 | 5 | 5 | | | |

Using each of the recording solutions having the compositions 1 to 6, inkjet recording was performed in an inkjet printer (Desk-Writer 550C, manufactured by Hewlett Packard, Ltd.). The paper used was plain paper (NBS PAPER produced by NBS Ricoh, recycled and neutral paper). With the respective compositions, letters were printed and made solid. The matters printed with the compositions 1, 2 and 3 were designated as Examples 1, 2 and 3, and the matters printed with the compositions 4, 5, 6 were designated as Comparative Examples 1, 2 and 3, respectively.

Effect Example 1:

In order to verify the effect of preventing the color change of the image by the additive of the present invention, the printed matters were subjected to an accelerated light fastness test under a xenon arc lamp for 48 hours. The test was performed according to Japanese Industrial Standard (JIS) L0843-1971 "Test method of color fastness to xenon arc lamp (19)". In the evaluation, an optical density was measured using a densitometer and the results calculated according to the following formula was used as a dye residual ratio.

$$\text{Residual Ratio (\%)} = (D/D_0) \times 100$$

wherein $D$ is an optical density after the accelerated light fastness test (after 48 hours) and $D_0$ is an optical density before the accelerated light fastness test.

The results obtained are shown blow.

|  | Residual Ratio (%) |
|---|---|
| Example 1 | 67 |
| Example 2 | 89 |
| Example 3 | 89 |
| Comparative Example 1 | 41 |
| Comparative Example 2 | 67 |
| Comparative Example 3 | 82 |

In the Examples using the compositions having added thereto the compound, respective colors were improved in the light fastness as compared with the Comparative Examples using the compositions where the compound was not added, thus revealing the effect.

EXAMPLES 4 TO 6

Addition to Recording Sheet:

Recording solutions were prepared each to have the composition shown in Table 2. In the Table, the numerals are in parts by weight.

TABLE 2

| Composition No. | Composition 7 | Composition 8 | Composition 9 |
|---|---|---|---|
| Acid Red 1 | 2 | | |
| Acid Yellow 17 | | 2 | |

TABLE 2-continued

| Composition No. | Composition 7 | Composition 8 | Composition 9 |
|---|---|---|---|
| Acid Blue 249 | | | 2 |
| Glycerin | 12 | 12 | 12 |
| Ethylene glycol | 1 | 1 | 1 |
| Triethanolamine | 1 | 1 | 1 |
| Ion exchanged water | 84 | 84 | 84 |

A 5 wt % aqueous solution of sodium L-ascorbate-2-phosphate was prepared, coated on a plain paper (NBS PAPER produced by NBS Ricoh, recycled and neutral paper) and then dried. Thereafter, using the compositions 7, 8 and 9, letters were printed on the paper and made solid in an inkjet printer (Desk-Writer 500C, manufactured by Hewlett Packard, Ltd.). The printed matters were designated as Examples 4, 5 and 6, respectively.

COMPARATIVE EXAMPLES 4 TO 6

Using the compositions 7, 8 and 9, letters were printed on a plain paper (NBS PAPER produced by NBS Ricoh, recycled and neutral paper) and made solid in an inkjet printer (Desk-Writer 550C, manufactured by Hewlett Packard, Ltd.). The printed matters were designated as Comparative Examples 4, 5 and 6, respectively.

Effect Example 2:

In order to verify the effect of the present invention, an accelerated light fastness test was performed. The test method and the evaluation method were the same as in Effect Example 1.

The results obtained are shown below.

| | Residual Ratio (%) |
|---|---|
| Example 4 | 78 |
| Example 5 | 80 |
| Example 6 | 84 |
| Comparative Example 4 | 50 |
| Comparative Example 5 | 72 |
| Comparative Example 6 | 80 |

In the Examples using the paper having added thereto the compound, respective colors were improved in the light fastness as compared with the Comparative Examples using paper where the compound was not added, thus revealing the effect.

The recording solution for inkjet printing, the method for preventing discoloration and fading of an image and the recording sheet, obtained by using a stabilized ascorbic acid derivative which is the additive for inkjet recording of the present invention can exert an effect on the prevention of the color change of an image formed by inkjet printing and can improve the storage stability of an image. Furthermore, the additive of the present invention can impart light fastness to the inkjet printing.

While the invention has been described in detail and with reference to specific examples thereof, it will be apparent to one skilled in the art that various changes and modifications can be made therein without departing from the spirit and scope thereof.

What is claimed is:

1. An additive for inkjet printing, comprising a stabilized ascorbic acid derivative.

2. The additive according to claim 1, wherein said stabilized ascorbic acid derivative is:

an ascorbic acid derivative wherein at least one of the groups derived from the hydroxyl groups at the 2- and 3-positions of ascorbic acid is an ester with an inorganic or organic acid or a glycoside with a saccharide and at least one of the groups derived from the hydroxyl groups at the 5- and 6-positions of ascorbic acid may form an ester with an inorganic or organic acid; or a salt thereof.

3. The additive according to claim 2, wherein said stabilized ascorbic acid derivative is:

an ascorbic acid derivative wherein the group derived from the hydroxyl group at the 2-position of ascorbic acid is an ester with a phosphoric acid or a glucoside with a glucose and at least one of the groups derived from the hydroxyl groups at the 3-, 5- and 6-positions of ascorbic acid may form an ester with an inorganic or organic acid; or a salt thereof.

4. The additive according to claim 2, wherein said stabilized ascorbic acid derivative is an alkali metal, alkaline earth metal or transition metal salt of ascorbic acid-2-phosphate, an ascorbic acid-2-glucoside or a 6-ester thereof with an organic acid.

* * * * *